United States Patent [19]

Braithwaite

[11] 4,255,178
[45] Mar. 10, 1981

[54] GLASSWARE FORMING MACHINES

[75] Inventor: David Braithwaite, Doncaster, England

[73] Assignee: Emhart Industries, Inc., Farmington, Conn.

[21] Appl. No.: 24,826

[22] Filed: Mar. 28, 1979

[30] Foreign Application Priority Data

Apr. 10, 1978 [GB] United Kingdom ............... 13973/78

[51] Int. Cl.³ .............................................. C03B 9/193
[52] U.S. Cl. .......................................... 65/79; 65/64; 65/80; 65/230; 65/241; 65/260
[58] Field of Search ....................... 65/235, 64, 79, 80, 65/229, 230, 241, 260

[56] References Cited

U.S. PATENT DOCUMENTS

| 2,075,363 | 3/1937  | Smith  | 65/235 X |
| 3,622,305 | 11/1971 | Becker | 65/229   |
| 3,644,111 | 2/1972  | Becker | 65/158   |
| 3,914,120 | 10/1975 | Foster | 65/229   |
| 4,010,021 | 3/1977  | Foster | 65/229   |
| 4,043,787 | 8/1977  | Foster | 65/229 X |

FOREIGN PATENT DOCUMENTS 1441099 6/1976 United Kingdom .
1491859 11/1977 United Kingdom .

OTHER PUBLICATIONS

*Glastechnische Berichte*, Mar. 1975, vol. 48, issue 3, pp. 43–50, "Stand der Heye Maschinenentwicklung".
"The Heye-Maul 1-2 Machine", Jack Foyil, *Glass Industry*, Oct. 1977.

*Primary Examiner*—Arthur D. Kellogg
*Attorney, Agent, or Firm*—H. Samuel Kieser

[57] ABSTRACT

An individual section of a multiple section glassware forming machine has three operating stations in spaced apart relation along the longitudinal center line of the section. Three independently operable transfer means move, respectively, a parison formed in an upright position at the first station to the second station, a further formed parison from the second station to the third station, and an article of glassware from the third station to a takeout position over a deadplate. The operating speed and rate of acceleration of each of the three transfer means is selected independently of the operating speed and rate of acceleration of both the other transfer means to effect its movement in the shortest practicable time compatible with the state of the glass during the movement of that transfer means.

13 Claims, 12 Drawing Figures

GLASSWARE FORMING MACHINES

CROSS REFERENCES TO RELATED APPLICATIONS

Related inventions form the subject matter of application Ser. No. 024,646 of Thomas Vincent Foster, and application Ser. No. 024,647 of Frank Alan Fenton, both filed on the same day as the present application.

BACKGROUND OF THE INVENTION

This invention relates to individual sections of multiple section glassware forming machines and to processes of forming glassware using such machine sections.

In co-pending patent application Ser. No. 024,646 of Thomas Vincent Foster, filed on the same day as the present Application there is described and claimed an individual section of a multiple section glassware forming machine which comprises three operating stations which are, respectively, a first station including a blank mould for forming a parison, a second station in which reheating of a parison takes place, and a third station including a blow mould for finally shaping an article of glassware, and independently operable first and second transfer means, the first transfer means including a neck ring structure and actuating means for moving the neck ring structure from a first position in which the neck ring structure engages a parison in the blank mould at the first station to a second position in which the neck ring structure releases a parison at the second station and returning the neck ring structure from the second position to the first position prior to the formation of another parison in the blank mould at the first station, and the second transfer means including gripping means and actuating means for moving the gripping means between a first position in which the gripping means engages a parison at the second station and a second position in which the gripping means holds the parison in such a location at the third station that the blow mould at the third station can close around the parison.

In the glassware machine sections described in the said co-pending patent application, the second transfer means includes first and second gripping means which are movable simultaneously between first and second positions by the second transfer actuating means, the second gripping means transferring the shaped articles of glassware from the third station to a takeout position beyond the third station, for example a deadplate.

In the said co-pending patent application the group of machine functions for forming a parison from a gob of molten glass at the first station is defined collectively as a primary cycle. The group or sequence of machine functions for forming an article of glassware in a blow mould at the third station is similarly defined as a secondary cycle. The apparatus described and claimed in the said co-pending patent application enables the time for which the parison is reheated after its formation in the primary cycle and before the formation of the article of glassware in the secondary cycle to be adjusted without altering the time of operation of any of the machine functions included in either the primary cycle or the secondary cycle relative to the timing of any other of the machine functions included in the same cycle. Thus, when the reheating time of the parison is altered a corresponding consequential change is effected in at least one of the groups of machine functions respectively constituting the primary cycle and the secondary cycle. Such a process is also claimed in the said co-pending application.

In one of the embodiments of apparatus described in the said co-pending patent application the first station includes an upright top-opening blank mould in which the parison is formed, and the present invention is particularly concerned with an improvement in and modification of this embodiment of the invention described in the said co-pending patent application.

SUMMARY OF THE INVENTION

According to the present invention there is provided an individual section of a multiple section glassware forming machine which comprises three operating stations which are, respectively, a first station including an upright top-opening blank mould for forming a parison, a second station in which reheating of a parison takes place, and a third station including a blow mould for finally shaping an article of glassware, first transfer means including a neck ring structure and actuating means for moving the neck ring structure from a first position in which the neck ring structure engages a parison in the blank mould at the first station to a second position in which the neck ring structure releases the parison at the second station and returning the neck ring structure from the second position to the first position prior to the formation of another parison in the blank mould at the first station, second transfer means including a first ripping means for supporting a parison and actuating means for moving the first gripping means between a first position in which the first gripping means supports a parison at the second station and a second position in which the first gripping means supports the parison in such a location at the third station that the blow mould at the third station can close around the parison, and a third transfer means including second gripping means and actuating means for moving the second gripping means between a first position in which the second gripping means engages an article of glassware at the third station and a second position in which the second gripping means holds the article of glassware at a takeout position beyond the third station, the actuating means of each of the first, second and third transfer means being operable independently of the other two actuating means whereby each of the neck ring structure, the first gripping means and the second gripping means is movable between its first and second positions at times independent of the times of corresponding movement of the other two of the said neck ring structure, the first gripping means, and the second gripping means.

BRIEF DESCRIPTION OF THE DRAWINGS

The present invention will be further understood from the following detailed description which is made, by way of example, with reference to the accompanying drawings in which.

In the drawings the same or similar parts are designated by like reference numerals.

DETAILED DESCRIPTION

Figure 1:
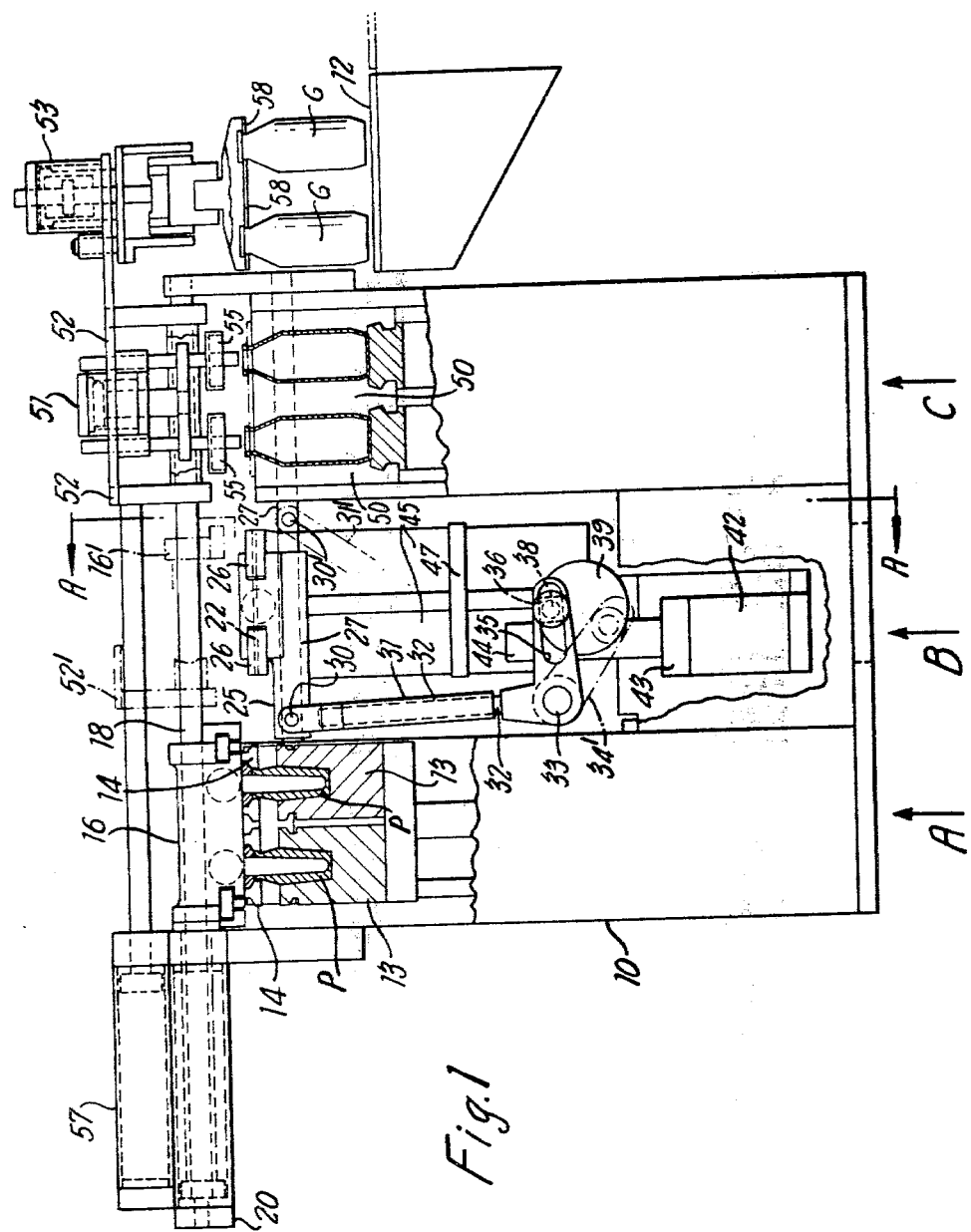
FIG. 1 is a side view partly in vertical longitudinal section, of one embodiment of a glassware forming machine section in accordance with the present invention, the sectional part of the view being taken along the longitudinal centre line of the machine section.

Reference will now be made to the accompanying drawings and initially to FIGS. 1 to 3 which show a first embodiment of apparatus in accordance with the present invention. These Figures are a side elevational view, a plan view and a transverse vertical cross-sectional view of an individual section of a glassware forming machine having a frame 10 within which there are three operating stations or areas provided in spaced apart relationship along the longitudinal centre line of the section, these stations being designated generally as a first station A, a second station B and a third station C. The machine section shown is particularly adapted for "double gob" operation wherein a pair of glassware parisons are initially formed at the station A in an upright position by pressing. The parisons are then transferred to station B where they are supported for reheating and optionally other further forming as desired before being transported to the station C for final shaping as articles of glassware, such as bottles. When the glassware articles have been finally shaped at station C they are moved out of the machine section to a position over a deadplate 12 before being moved to a takeaway conveyor (not shown) where they are placed in line with other similar articles formed by the other individual sections of the forming machine.

The machine section shown utilises upright blank or parison moulds 13, 13 at the station A in which parisons are formed by pressing in a manner generally similar to that described in our U.K. Patent Specification No. 1,491,859. The blank moulds 13, 13 illustrated in FIG. 1 herein are three-piece moulds comprising solid body portions, intermediate portions, and the neck ring structures 14, 14 which are supported on a transfer carriage 16 in similar manner to that disclosed in our said U.K. Pat. No. 1,491,859. However, the parisons may alternatively be formed in accordance with the present invention using twopiece blank moulds. Although the parisons formed using apparatus in accordance with the present invention may have either single bead or double bead finishes, the description which follows will relate to the manufacture of parisons having single bead finishes.

The transfer carriage 16 which carries the neck rings 14, 14 is reciprocable along horizontal parallel guide rods 18, of which only one is visible in FIG. 1 by piston and cylinder actuating means 20. There are two piston and cylinder devices constituting the actuating means 20 for the transfer carriage 16, the pistons of each of the devices embracing one of the guide rods 18. The piston and cylinder actuating means 20 together with the transfer carriage 16, the neck ring structures 14, 14 and the horizontal guide means comprising rods 18 constitute the first transfer means.

When the parisons have been formed in the blank moulds 13, 13, the blank moulds are opened leaving the parisons P, P suspended from the neck ring structures 14, 14 at station A. Once all the parts of the blank moulds 13, 13 have been moved clear of the parisons P, P the piston and cylinder means 20 are operated to move the transfer carriage 16 from its first position at station A as illustrated in FIG. 1, to its second position at station B. The righthand end of the transfer carriage is indicated in this second position at station B by dashed lines and the reference numeral 16' in FIG. 1. In this second position the neck ring structures 14, 14 of the first transfer means support the parisons in positions where these may be engaged by support jaws 22, 22 constituting part of a second transfer means.

Figure 2:
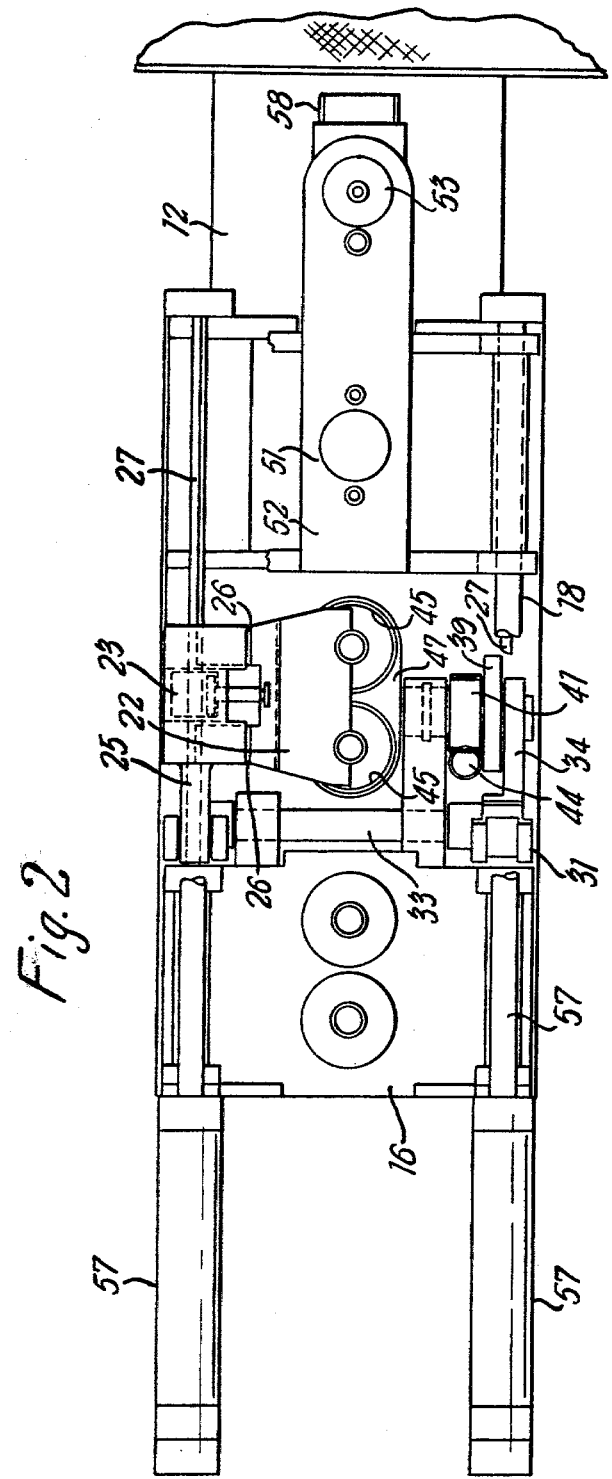
FIG. 2 is a plan view of the apparatus shown in FIG. 1.

In FIG. 2 only one of the support jaws 22 is shown, the other being omitted in order that the actuating means of the second transfer means may be shown. In FIG. 3 the apparatus at station B is shown, on the left side of the centre line, in the open position awaiting the receipt of parisons from station A, while on the righthand side of the centre line of FIG. 3 the apparatus is shown in position adopted while parisons are reheating at station B. Consequently, the lefthand support jaw 22 is shown in its open or retracted position, while the righthand support jaw 22 of FIG. 3 is shown in its operating position supporting a reheating parisons P of which half is also shown.

Figure 3:
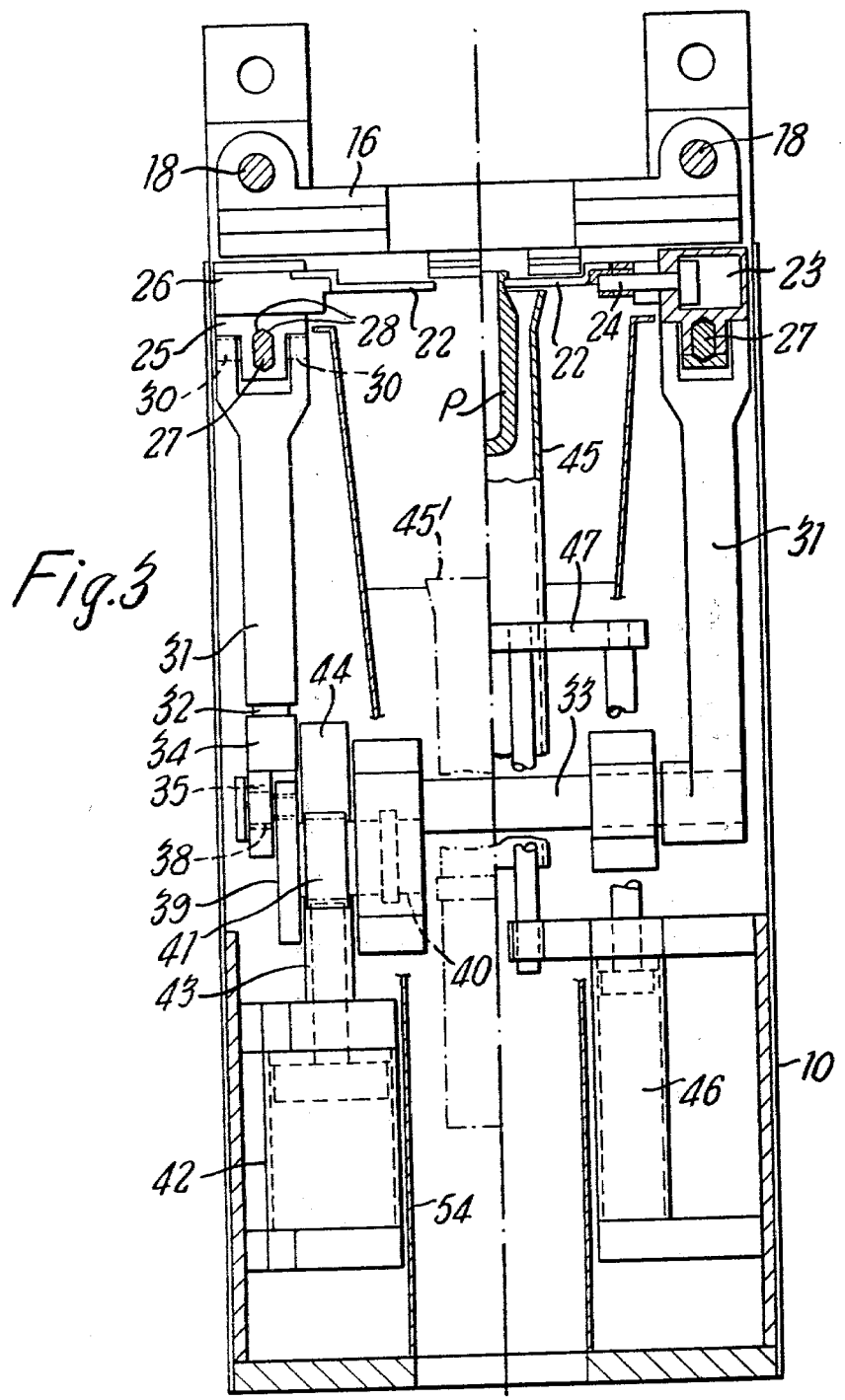
FIG. 3 is a transverse vertical cross sectional view of the apparatus of FIG. 1 taken along the line A—A of that Figure, but having part broken away to show in section a portion of a reheating parison at the second station.

As shown in the righthand half of FIG. 3 and in the upper part of the plan view which is FIG. 2, piston and cylinder devices 23 are provided for moving the support jaws 22 between their open and closed positions, a respective support jaw 22 being secured to each piston 24. The piston and cylinder devices 23 are mounted on a second transfer carriage 25 which also carries slides 26 (FIG. 1) in which the support jaws 22 slide upon actuation of the piston and cylinder devices 23.

The transfer carriage 25 of the second tranfer means is reciprocable along horizontal guide rails 27, 27 which, as shown in FIG. 3, are formed with a pair of upper angled surfaces 28, 28 which are bearing surfaces engaging with correspondingly shaped surfaces on the second transfer carriage 25.

The second transfer carriage 25 is connected by pins 30 to an extension lever 31 which slidably engages with a lever 32 which is mounted to a pivotable shaft 33 as one arm of a bell crank lever 34. The other arm of the bell crank lever 34 has therein a slot 35 engaging a square 36 which is pivotally mounted on a circular projection 38 projecting from a disc 39 mounted on a rotatable shaft 40 which also carries a gear 41 (FIGS. 2 and 3).

In FIGS. 1 and 3 there is shown a piston and cylinder actuating means 42, the piston 43 of which has a rack extension 44, the teeth of which engage with the gear 41.

Referring more particularly to FIGS. 1 and 3, when the piston and cylinder actuating means 42 is operated to move the piston 43 and the rack extension 44 vertically, the gear 41 and the shaft 40 to which it is mounted are rotated together with the disc 39 so that the projections 38 and square 36 (which engages in the slot 35) cause the bell crank lever 34 to be rotated between the position shown in full lines in FIG. 1 and the position 34' shown in dashed lines, at which time the lever extension 31 and the pins 30 are in the position shown in FIG. 1 at 31' and 30'. The second transfer carriage 25 is thus moved from the first position shown in full lines in FIG. 1 where the support jaws 22 are in their first position at station B, to the position of the second transfer carriage 25 in which the support jaws 22 are at their second position at station C.

When the first transfer means is operated to move parisons P, P from station A to station B, the second transfer means is in the position shown in full lines in FIG. 1 at station B with the support jaws 22, 22 open. Immediately the first transfer carriage 16 and the parisons P, P held by the neck rings 14, 14 thereon come to rest at station B, the piston and cylinder devices 23 actuate the support jaws 22, 22 to be closed whereupon the neck ring structures 14, 14 are opened. The parisons P, P which are thus released from the neck ring structures 14, 14 drop a short distance before being supported by their beads on the support jaws 22, 22. The transfer carriage 16 is then returned from station B to station A by the piston and cylinder actuating means 20 so that the neck ring structures 14, 14 are brought from their second position at station B to their first position at station A for the formation of the next parisons in the blank moulds 13, 13 at station A.

As soon as the transfer carriage 16 supporting the parisons, P, P has come to rest at station B, shrouds 45, 45, which are movable as a single member, are raised from the position shown at 45' in FIG. 3 to the position shown at 45 in that Figure by a piston and cylinder actuating means 46 through a support member 47. In their raised position each of the shrouds 45 surrounds one of the parisons so that each of the parisons is protected from unwanted heat radiation from the neighbouring parison and also from cooling effects occasioned by undesired air movements.

After a selected time, during which the parisons have been supported at station B by the support jaws 22, 22 for reheating and, optionally, other further forming (for example by selective cooling) or other treatment (for example surface coating), the shrouds 45, 45 are lowered to the position shown at 45' and the piston and cylinder actuating means 42 is then operated as a result of which the second transfer carriage 25 and the further formed parisons P' carried by the support jaws 22, 22 thereon are moved from station B to station C. At station C the support jaws 22, 22 hold further formed parisons in positions where the elements of blow moulds 50, 50 may close about the further formed parisons.

Figure 8:
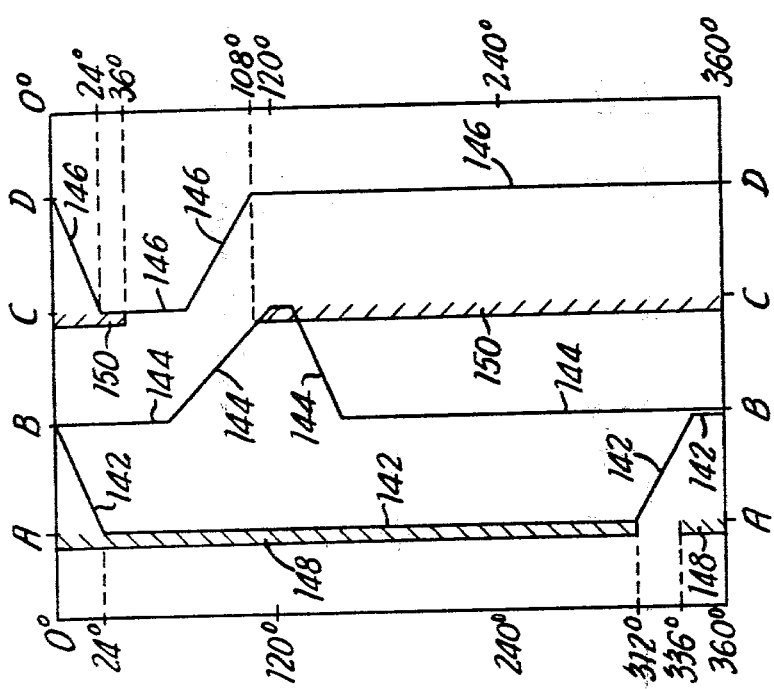
FIG. 8 is a schematic breakdown similar to FIG. 7 showing the manner in which the reheat time may be varied without effecting any alteration of the relative timing of the machine functions which comprise the primary cycle or the relative timing of the machine functions which comprise the secondary cycle.

The blow mould structure at station C, which is not illustrated in detail in FIGS. 1 to 3, may advantageously be similar to the blow mould structure illustrated in FIG. 8 of said U.K. Pat. No. 1,491,859. However, the apparatus for finally shaping the articles of glassware from the further formed parisons transferred to station C differs from the apparatus disclosed in the said U.K Patent in the arrangement of the blowhead assembly. The arrangement of the said U.K. Patent in which the blowhead assembly is mounted in a combined assembly with the takeout tongs for removing the articles of glassware from station C is not used in apparatus in accordance with the present invention.

In the first embodiment of the invention a blowhead assembly indicated generally by the reference numeral 51 is carried by a third transfer carriage 52 which also carries a takeout unit indicated generally by reference numeral 53. However, the blowhead assembly 51 is longitudinally displaced from the takeout unit 53 on the third transfer carriage 52 by a distance equivalent to the distance between station C and the takeout position in which articles of glassware G, G are supported over the deadplate 12. The blowhead assembly 51 is thus positioned at station C (as shown in FIG. 1) when the takeout unit 53 is in the takeout position over the deadplate 12.

When the blow moulds 50, 50 at station C have closed about the further formed parisons, the support jaws 22, 22 of the second transfer means are opened, thus releasing the further formed parisons which drop a further short distance to be supported by the necks of the closed blow moulds 50, 50. When the support jaws 22, 22 are fully open the piston and cylinder actuating means 42 of the second transfer means moves the rack extension 44 upwardly thereby rotating the gear 41 and the shaft 40 in a clockwise direction (as seen in FIG. 1) to return the support jaws 22, 22 to the position at station B in which they are shown in FIG. 1. The support jaws 22, 22 then await the receipt of further parisons P, P from station A.

The arrangement shown at station B for supporting the parisons P, P during reheating and other further forming means that the lower part of station B is relatively free of permanent apparatus and there may be provided a chute 54 (FIG. 3) for the removal of cullet. Such cullet removal is an important advantage of apparatus in accordance with the preferred embodiments of the present invention described herein as compared with the apparatus of U.K. Pat. No. 1,491,859 and the second embodiment of the said co-pending patent application, and enables malformed parisons produced during an initial warming-up period of the apparatus to be removed at station B so that broken glass from such malformed parisons is prevented from being transferred into the blow moulds 50, 50.

When the second transfer means has returned the support jaws 22, 22 from their second positions at station C to their first positions at station B, the blowhead assembly 51 is lowered so that blowheads 55, 55 thereon engage the necks of the further formed parisons supported in the blow moulds 50, 50 at station C.

Final shaping of articles of glassware G, G in the blow moulds 50, 50 can commence by vacuum forming (i.e. by applications of a pressure lower than atmospheric) over the blow moulds 50, 50 as soon as these blow moulds 50, 50 are closed. When the blowhead assembly 51 is lowered, the blowheads 55, 55 thereon also deliver air to the interior of the articles of glassware G, G being formed in the blow moulds 50,50 thereby providing some additional pressure and also cooling.

When final shaping of the articles of glassware G, G in the blow moulds 50, 50 at station C has been completed, the blowhead assembly 51 is raised away from the necks of the articles of glassware G, G and simultaneously takeout tongs 58, 58 of a takeout unit 53 are lowered and opened to deposit a previous pair of articles of glassware G, G onto the deadplate 12. Piston and cylinder actuating means comprised by two piston and cylinder devices 57, the pistons of which are connected to the third transfer carriage 52 is then operated to move the transfer carriage 52 from the position shown in full lines in FIG. 1 to the position shown in broken lines at 52'. The third transfer carriage 52 runs on the same guide rods 18, 18 on which the first transfer carriage 16 is reciprocated. The movement of the third transfer carriage 52 from right to left as seen in FIG. 1 brings the takeout tongs 58, 58 of the takeout unit 53 to their first position at station C. In this first position the takeout tongs 58, 58 are closed in conventional manner to grip the finish at the tops of the formed articles of glassware G, G after the blow moulds 50, 50 are fully opened. When the blow moulds 50, 50 are fully open, the takeout tongs 58, 58 are raised to lift the articles of glassware G, G clear of the bases of the blow moulds 50, 50 and the piston and cylinder actuating means 57, 57 is operated to transfer the articles of glassware G, G to the illustrated position over the deadplate 12.

In the first embodiment of the invention which has been described, the movements of all the three transfer means are linear horizontal movements, that is to say, the parisons are moved in a straightline movement determined by guide rods 18, 18 from station A to station B, the further formed parisons are moved in a straightline movement determined by guide rails 27, 27 from station B to station C, and the articles of glassware are moved in a horizontal straightline movement determined by guide rods 18, 18 from station C to a cooling position over the deadplate 12. However, it will be appreciated that any one or more of the movements of the three transfer means in apparatus in accordance with the present invention may be other than straightline movements, and there will be described a second embodiment of the present invention in which the further formed parisons are moved from station B to station C in an arcuate movement, and the articles of glassware G, G are taken out from station C to the cooling position over the deadplate 12 in an arcuate movement.

The second embodiment of the present invention which will now be described with reference to FIGS. 4 to 6 of the accompanying drawings also differs from the first embodiment described with reference to FIGS. 1 to 3 in that it has a blowhead assembly permanently situated at station C.

Figure 4:
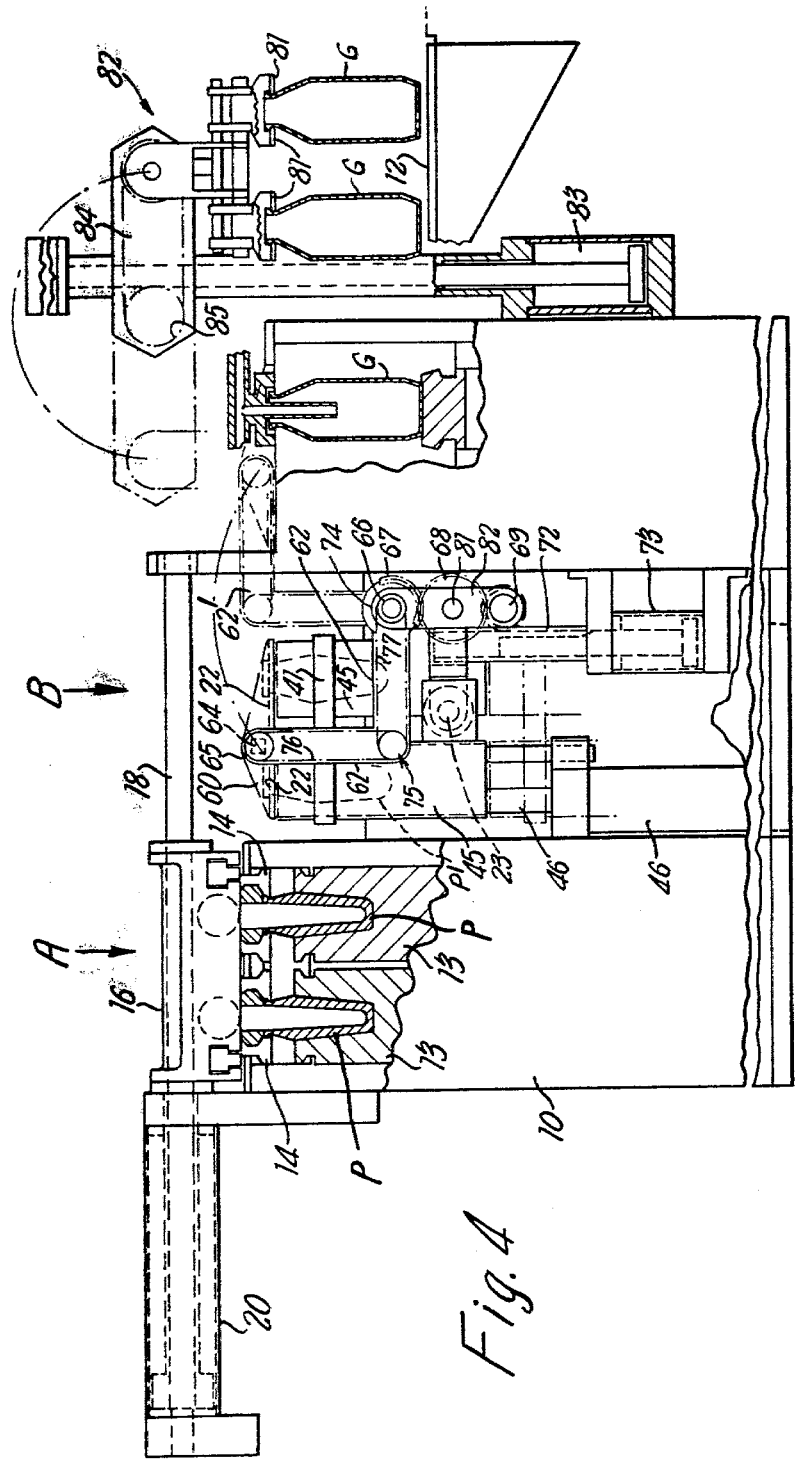
FIG. 4 is a side view, similar to FIG. 1, of another embodiment of glassware forming machine section in accordance with the present invention.
Figure 5:
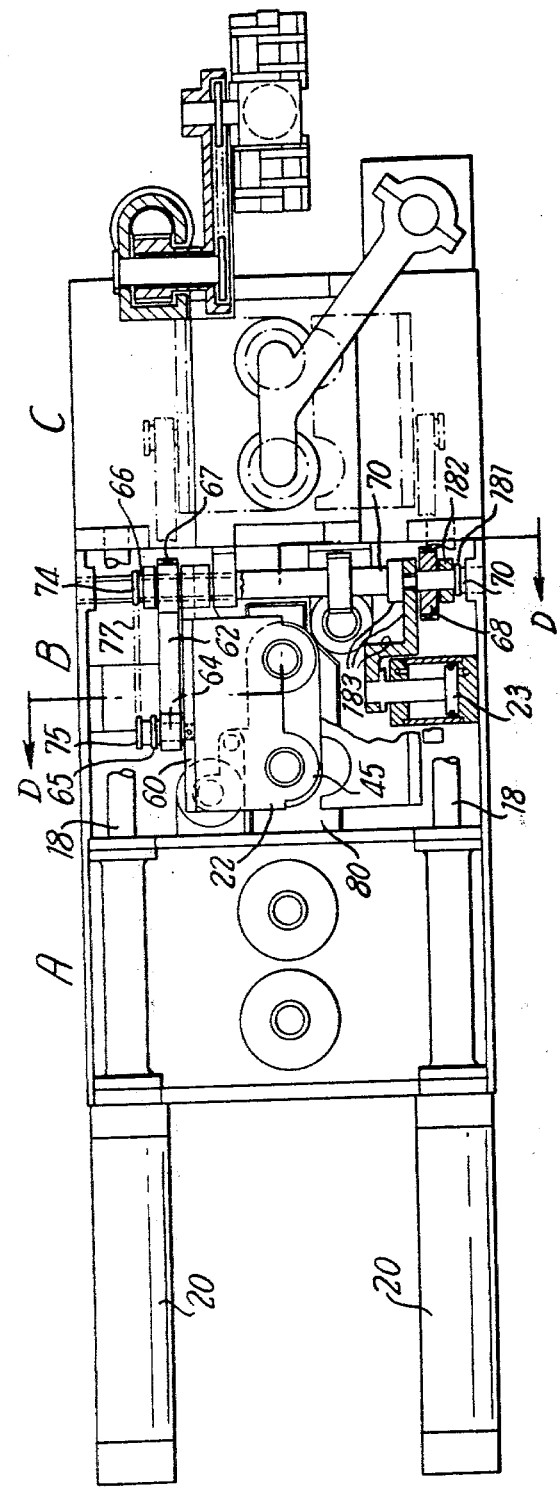
FIG. 5 is a plan view of the glassware forming machine section of FIG. 4 with part broken away to show some detail in section.
Figure 6:
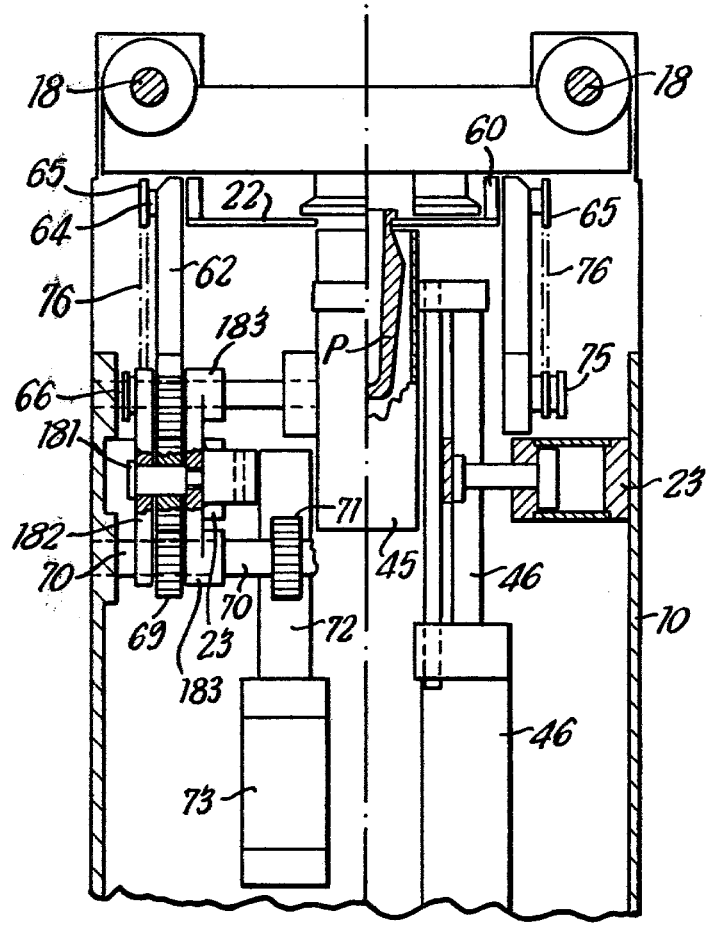
FIG. 6 is a transverse vertical cross-sectional view of the glassware forming machine section of FIGS. 4 and 5 taken along the line D—D of FIG. 5.

Referring to FIGS. 4 to 6 of the accompanying drawings, FIGS. 4 and 5 are respectively a side view (in part section on the line F—F of FIG. 5) and a plan view (also in part section on the line E—E of FIG. 6) of an individual section of a glassware forming machine having three operaating stations of areas arranged similarly to the three operating stations of the first embodiment of the present invention and similarly designated as a first station A, a second station B and a third station C. The apparatus at the first station A and the first transfer means are essentially similar to the corresponding apparatus of the first embodiment and will not be described any further.

The support jaws 22, 22 are actuable by respective piston and cylinder devices 23 (of which one only is shown in FIG. 5 and only one is shown sectioned in FIG. 6) relative to a member 60 in a manner which will be described below. The member 60 is itself pivotally mounted on a pair of right-angle levers 62 at pivots 64 each of which is formed integrally with a sprocket 65. The right-angle levers 62 are mounted to a shaft 66 through respective spur gears 67, only one of which is shown in FIG. 6. Spur gear 67 (FIGS. 4 and 6) engages with an idler gear 68 which in turn engages with a drive gear 69 which is mounted on a shaft 70. Shaft 70 also carries a gear 71 (FIG. 6) which is engaged by a rack extension 72 on the piston of a piston and cylinder actuating means 73.

Each sprocket 65 is connected to one half of a duplex sprocket 75 mounted at the angle of the respective right-angle lever 62 by a chain 76 and the other half of duplex sprocket 75 is connected by a chain 77 to a fixed sprocket 74 (FIG. 5) mounted on shaft 66.

As described with reference to the first embodiment the support jaws 22, 22 are closed about parisons P, P as soon as these are brought to rest at station B by the first transfer means. Once the support jaws 22,22 are fully closed the neck rings 14,14 open and the parisons P drop a short distance before being supported by their beads on the support jaws 22, 22. The first transfer carriage is then returned from station B to station A.

As soon as the first transfer carriage has come to rest at station B, shrouds 45, 45 are raised to the positions shown in FIGS. 4 and 6 so that each of the parisons is surrounded and protected from unwanted heat radiation from the neighbouring parison and also from cooling effects occasioned by undesired air movements.

After a selected time, during which the parisons have been supported at station B by the support jaws 22, 22 for reheating and optionally other further forming (for example by selective cooling) the shrouds 45 are lowered and the piston and cylinder actuating means 73 is then operated so that the rack extension 72 is raised and shafts 70 and 66 are rotated in a clockwise dirrection as seen in FIG. 4. The right-angle lever 62 is therefore also rotated in a clockwise direction about shaft 66 to the position shown in dashed lines at 62' in FIG. 4.

The support jaws 22, 22 are thus moved in an arcuate motion from the position shown in FIG. 4 to a position in which the support jaws 22, 22 hold further formed parisons in positions at station C where the elements of blow moulds 50, 50 may close about the further formed parisons. During this arcuate motion the chains 77, 76 are effective to rotate duplex sprocket 75 and sprocket 65 and pivot 64 so that the member 60 and the support jaws 22, 22 mounted thereon are maintained in a horizontal position.

The support jaws 22, 22 are actuated by two piston and cylinder devices 23 (one per support jaw) the cylinders of which are fixed to the section frame 10. The piston rod of the device 23 is attached to a T-shaped gear carrier 183 (shown in partial section in FIG. 5 on the line E—E of FIG. 6). Gear carrier 183 is slidably supported on shafts 66 and 70. A further gear carrier 182 is also slidably supported on shafts 66 and 70. The gears 67, 68 and 69 are disposed between the two gear carriers 183 and 182 which are connected together by a shoulder screw 181, the shoulder of which serves as the pivot for idler gear 68. The whole assembly comprising the gear carriers 183 and 182 and the gears located therebetween, together with driven gear 69 and right-angle lever 62 (to which support jaws 22, 22 are attached) can reciprocate on shafts 66 and 70 when device 23 is actuated. This mechanism functions when the support jaws are at either station B or station C.

Referring to FIG. 5 there is shown a blowhead assembly 78 which is a conventional blowhead assembly similar to that used on an I.S. machine and is located at station C as part of the structure at that station.

When the blow moulds 50, 50 at station C have closed about the further formed parisons, the support jaws 22, 22 of the second transfer means are opened, thus releasing the further formed parisons which drop a further short distance to be supported by the necks of the closed blow moulds 50, 50. When the support jaws 22, 22 are fully open the piston and cylinder actuating means 73 of the second transfer means moves the rack extension 72 downwardly thereby rotating the shafts 70 and 66 in an anticlockwise direction (as seen in FIG. 4) to return the support jaws 22, 22 in an arcuate movement to the position at station B in which they are shown in full lines in FIG. 4. The support jaws 22, 22 then await the receipt of further parisons P, P from station A.

Again the arrangement shown at station B for supporting the parisons P, P during reheating and other further forming means that the lower part of station B is relatively free of permanent apparatus and there is provided an aperture 80 in the base of station B for the removal of cullet.

When the second transfer means has returned the support jaws 22, 22 from their second positions at station C to their first positions at station B, the blowhead assembly 78 is lowered so that blowheads 79, 79 thereon engage the necks of the further formed parisons supported in the blow moulds 50, 50 at station C.

Articles of glassware G, G are finally shaped in the blow moulds 50, 50 as already described for the first embodiment of the present invention. When the final shaping of the articles of glassware has been completed, the blowhead assembly 78 is raised away from the necks of the articles of glassware G, G and simultaneously takeout tongs 81, 81 of a takeout unit 82 are lowered and opened to deposit a previous pair of articles of glassware G, G onto the deadplate 12. A piston and cylinder actuating means 83 is then operated to rotate an arm 84 in an anticlockwise direction about a pivot shaft 85 thereby moving the takeout tongs 81, 81 from their second position over the deadplate 12, as illustrated in FIG. 4 to their first position at station C. In their first position the takeout tongs 81, 81 close to grip the finish at the tops of the formed articles of glassware G, G after the blow moulds 50, 50 are opened. When the blow moulds 50, 50 are fully open, the takeout tongs 81, 81 are moved in a return arcuate motion to transfer the articles of glassware G, G to the illustrated position over the deadplate 12.

A first example of the operation of the machine section illustrated in FIGS. 1 to 3 to produce articles of glassware by the press and blow process is now given in Table A below. With minor modifications the same Table A can give an example of operation of the machine section illustrated in FIGS. 4 to 6. In this Table A the times during the process cycle of the machine section during which certain machine functions are performed are set out in terms of a 360° cycle. These cycle times in degrees may be readily coverted into appropriate data form representative of the desired times for actuation of an electronic timing system to control the machine section, for example the electronic timing system described in U.K. Pat. No. 1,441,099.

TABLE A

| Time | STATION A | STATION B | STATION C | DEADPLATE |
|---|---|---|---|---|
| 0° | Load gobs | | | |
| 0°–24° | | ←1st transfer | | ←3rd transfer |
| 24°–36° | | | Blow moulds open | |
| 24°–48° | Inter moulds close | | | |
| 36°–60° | | | Takeout tongs close | |
| 48°–84° | Plungers down | | | |
| 60°–72° | | | Takeout tongs raise | |
| 60°–120° | | 2nd transfer → | | |
| 72°–108° | | | 3rd transfer → | |
| 108°–132° | | | Blow moulds close | |
| 120°–132° | | | Support jaws open | |
| 132°–156° | | ←2nd transfer | | |
| 156°–168° | | | Blowheads on | |
| 240°–264° | Plungers up | | | |
| 264°–288° | Inter moulds open | | | |
| 288°–312° | Body moulds down | | | |
| 312°–348° | | 1st transfer → | | |
| 336°–360° | Body moulds up | | | |
| 348°–360° | | Neck rings open & support jaws close | Blowheads off | Takeout tongs open |

Figure 7:
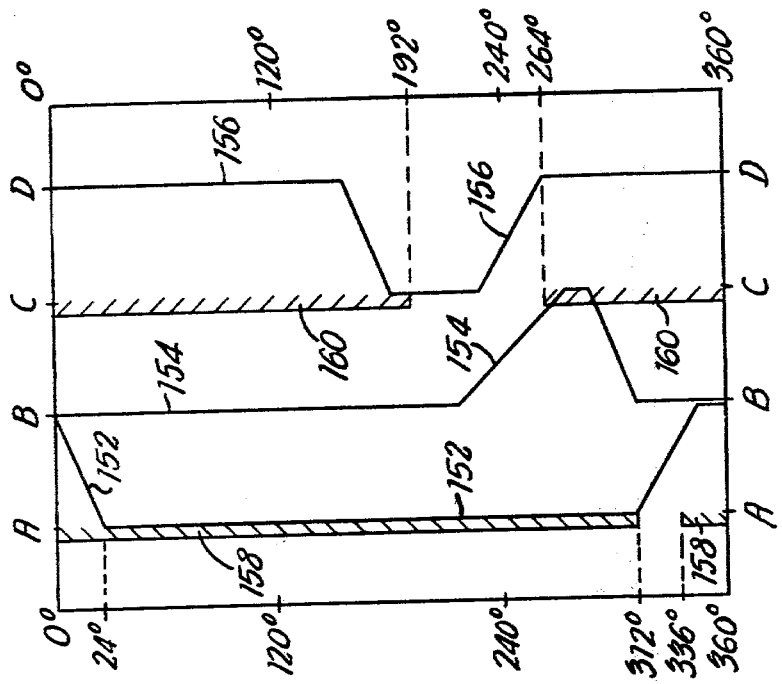
FIG. 7 is a schematic breakdown of the process cycle performed using the apparatus of either FIGS. 1 to 3 or FIGS. 4 to 6.

The movements of the first, second and third transfer means illustrated in Table A are shown in FIG. 7 by the lines 142, 144 and 146, respectively.

The neck ring structures 14, 14 of the first transfer means are advantageously caused to close during the movement of the first transfer means from its second position at station B to its first position at station A during the period from 0° to 24° in the process cycle of the machine section. Similarly, the takeout tongs 58, 58 are lowered relative to the takeout unit 53 during the movement of the third transfer means from its second position in which the takeout unit 53 is over the deadplate, to its first position in which the takeout unit 53 is at station C.

The sequence of operations set out in Table A shows that the parison is being pressed at station A during the period from 84° to 240°. The whole group or sequence of machine functions at station A, which together comprise the primary cycle during which the parison is formed, extend from 336° in one process cycle of the machine section, which is the time when the body moulds start to move upwards, to 312° in the succeeding cycle of the machine section, which is the time when the body moulds come to rest at the end of their downward movement. The primary cycle is represented by the crosshatahed area 148 in FIG. 7.

Referring again to Table A it will be seen that the further formed parisons are supported in the blow moulds 50, 50 at station C for a time extending from 132° in one cycle to 24° in the succeeding cycle of the machine section, i.e. 252°. Thus when vacuum forming is used there is a time of 252° in the process cycle available for forming the articles of glassware in the blow moulds 50, 50. Alternatively, if the articles of glassware G, G are formed solely by blowing in the blow moulds, the blowing time available extends from 168° to 348° i.e. 180°.

The whole group or sequence of machine functions which together comprise the secondary cycle performed at station C in order to form articles of glassware from the parisons extends from the commencement of the closing of the blow moulds at station C at 108° in one process cycle of the machine section to the instant at which the blow moulds are again fully open at 36° in the succeeding process cycle of the machine section as represented by cross-hatched area 150 in FIG. 7.

The period or duration of the primary cycle is therefore 336° and the duration of the secondary cycle is 288°. The parisons P, P are supported by the support jaws 22, 22 of the second transfer means from 0° to 120° which is the time between the point in the cycle at which these jaws become fully closed and the point in the cycle at which they start to open after movement of the second transfer means from its first position at station B to its second position at station C.

A second example of the operation of the same machine section to produce articles of glassware by the press and blow process is now given in Table B below:

TABLE B

| Time | STATION A | STATION B | STATION C | DEADPLATE |
|---|---|---|---|---|
| 0° | Load gobs | | | |
| 0°–24° | ←1st transfer | | | |
| 24°–48° | Inter moulds close | | | |
| 48°–84° | Plungers down | | | |
| 144°–156° | | | Blowheads off | Takeout tongs open |
| 156°–180° | | | | ←3rd transfer |
| 180°–192° | | | Blow moulds open | |
| 192°–216° | | | Takeout tongs close | |
| 216°–228° | | | Takeout tongs raise | |
| 216°–276° | | 2nd transfer → | | |
| 228°–264° | Plungers up | | | 3rd transfer → |
| 264°–288° | Inter moulds open | | Blow moulds close | |
| 276°–288° | | | Support jaws open | |
| 288°–312° | Body moulds down | | ←2nd transfer | |
| 312°–324° | | | Blowheads on | |
| 312°–348° | | 1st transfer → | | |
| 336°–360° | Body moulds up | | | |
| 348°–360° | | Neck rings open & support jaws. close | | |

The movements of the first, second and third transfer means illustrated in Table B are also shown in FIG. 8 by the lines 152, 154 and 156.

Referring to the process of Table B, the primary cycle, which consists of the group of machine functions performed at station A, is identical with the primary cycle of the process cycle of the machine section described in Table A and illustrated in FIG. 2. Accordingly, the primary cycle of the machine section process cycle of Table B is illustrated in FIG. 8 by cross-hatched area 158.

The secondary cycle of the machine section process cycle of FIG. 8 as described in Table B extends from the commencement of the closing of the blow moulds at station C at 264° to the instant when the blow moulds are again fully open at 192° in the succeeding process cycle of the machine section. The machine functions within this secondary cycle accordingly extend over a period of 288°, and the secondary cycle of Table B (like the primary cycle of that table) contains machine functions arranged in identical timed relation to the corresponding cycle of Table A. The secondary cycle of Table B is illustrated in FIG. 8 by the cross-hatched area 160.

However, in the process cycle illustrated in Table B and FIG. 8, the parisons P, P are supported in the support jaws 22, 22 of the second transfer means from the instant when these jaws are fully closed at 0° to the instant when the jaws commence to open at 276°. Accordingly, there is an increase in the reheat time of the parisons of 156° in the process cycle of Table B and FIG. 8 as compared with the process cycle of Table A and FIG. 7. The apparatus in accordance with the present invention therefore incorporates the same substantial flexibility in the reheating time of the parisons without any corresponding changes being required to be made within either the primary cycle or the secondary cycle that is shown by the apparatus described and claimed in the said co-pending Patent Application.

The manner in which operation of the apparatus in accordance with the present invention as hereinbefore described is changed, for example from the process cycle of FIG. 7 to the process cycle of FIG. 8 by moving all the machine functions which comprise either or both of the primary and secondary cycles will now be described with reference to FIGS. 9 to 12.

Figure 9:
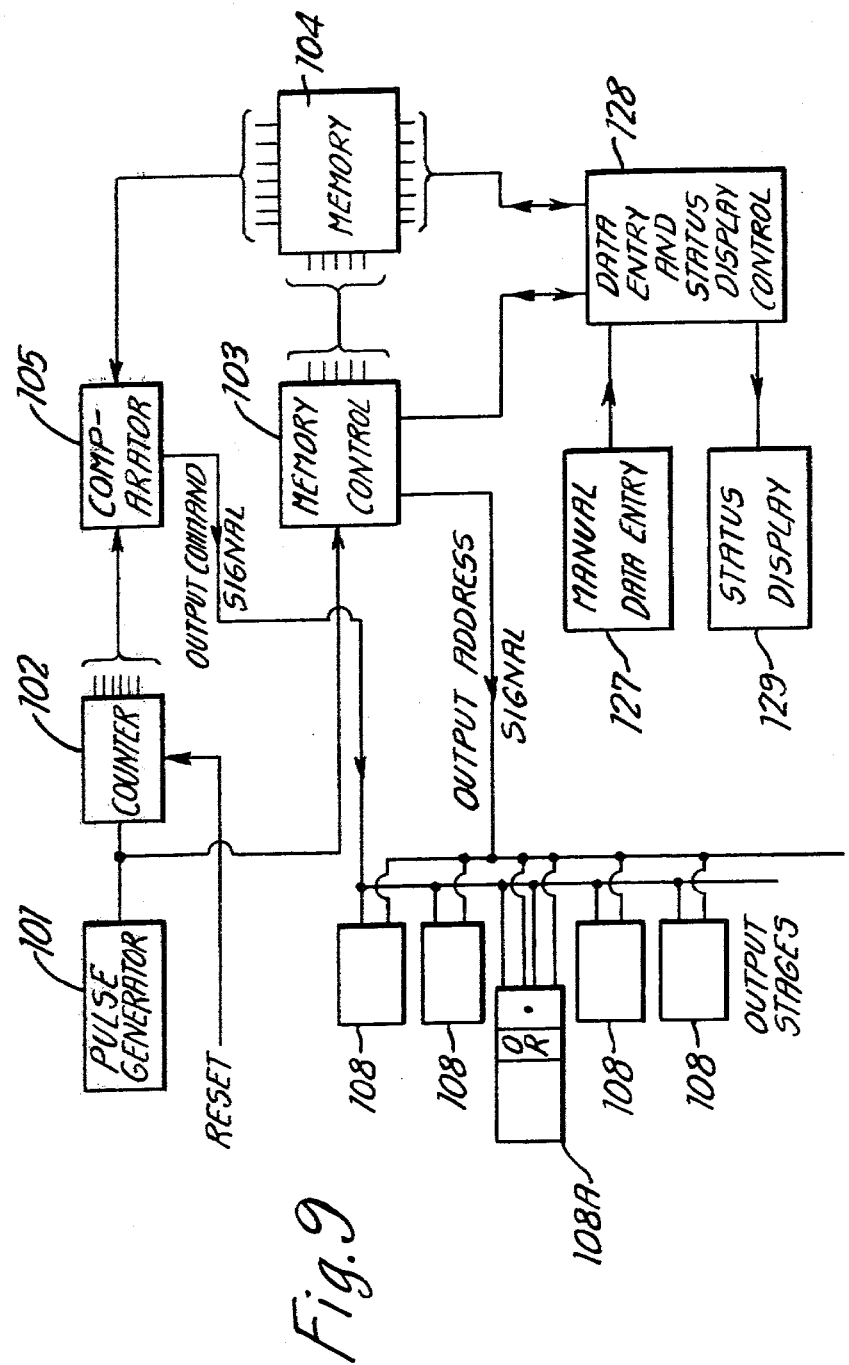
FIG. 9 is a block diagram of a system for operating a process in accordance with the present invention and as exemplified in FIGS. 7 and 8.

Referring to FIG. 9 there is shown diagrammatically an operating circuit for controlling the various events or machine functions in the machine sections which together comprise a multiple section glassware forming machine in accordance with the present invention. The circuit of FIG. 9 is similar to the circuit of U.K. Pat. No. 1,441,099. The logic sequence performed by the circuit of FIG. 9 is shown in FIG. 10.

Pulses from a pulse generator 101 are fed to a counter 102 and to a memory control 103. At the receipt of each pulse which advances the counter 102 one step in a count from 0 to 1023, the same pulse triggers the memory control 103 to initiate a scan of all the information concerning the events of the glassware forming cycle which are stored in a memory 104. The memory 104 may, for example, be a ferrite core store, and the memory control 103 controls the scan of the memory and the feeding of information representing event ON and OFF counts to a comparator 105 in which the ON and OFF counts are compared with the count in the counter, and an appropriate output command signal is given from the comparator 105.

Figure 10:
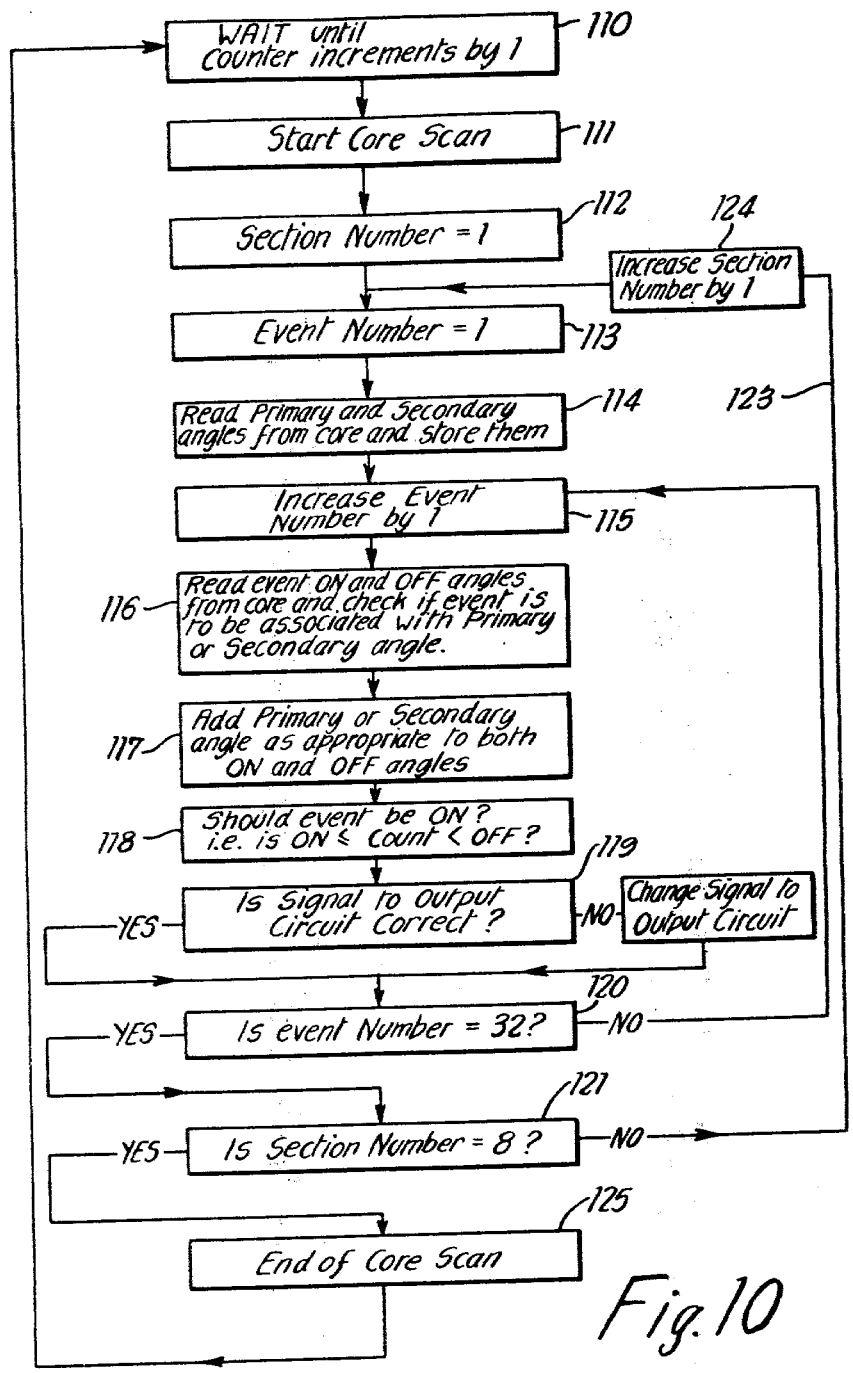
FIG. 10 is a logic sequence diagram showing the steps performed in carrying out the process in accordance with the present invention.

The logic sequence with which the memory control 103 controls the memory 104 to feed information to the comparator 105 and produce output command signals is illustrated in the logic sequence diagram which is FIG. 10.

Referring to FIG. 10 the receipt of a pulse from the pulse generator to advance the counter 102 to the next count figure, e.g. from 0920 to 0921, has the effect of activating the memory control 103 from the waiting condition in which it was waiting as indicated at 110 in FIG. 10, and initiates a core scan sequence as represented by box 111 in FIG. 10. At the start of the core scan the memory control 103 moves to the next step and interrogates the memory 104 by specifying that the section number shall equal 1 as indicated by box 112 and then that the event number shall equal 1 as specified by box 113.

Stored in electronic event number 1 of the memory 104 for each section are primary and secondary angles for the respective section. The primary and secondary angles are counts which may be chosen independently of one another but the values of which determine the relationship of the group of events or machine functions which comprise the primary cycle to the group of events or machine functions which comprise the secondary cycle. The actual count at which a machine function or event in, for example, the primary cycle takes place is determined by adding a count representative of the event ON and OFF angles to the count representative of the primary angle. Thus it may be seen that, by changing the count which represents the primary angle, the times at which all the events which comprise the primary cycle take place are changed by the same amount, whilst no corresponding change is made in the times or counts at which the events of the secondary cycle take place. On the other hand, the time at which any event in the primary cycle takes place relative to the other events in the primary cycle is changed by altering the count representative of the ON and OFF angles for that event.

Referring again to FIG. 10 once the memory control 103 has selected section number 1 and event number 1 its next action, as shown by box 114, is to read the primary and secondary angles from the memory 105 and store them. Since no event is controlled per se by the primary and secondary angles, there is no further logic function to be performed for event number 1 and the next step in the logic sequence, as indicated by box 115, is to increase the event number by 1. The memory control 103 then reads the event ON and OFF angles for that next event (i.e. event number 2) from the memory 104 and checks wheteher this event is to be associated with the primary angle or the secondary angle, as indicated by box 116. As a result of the decision arrived at regarding whether the event is associated with the primary or secondary angle, the memory control 103 proceeds to the next stage at which the primary or secondary angle, as appropriate, is added to both the ON and OFF angles for event number 2 as read from the memory 104.

If the sum of an event ON or OFF angle and the appropriate primary or secondary angle is greater than 1023, the memory control 103 automatically deducts 1024 from the total to obtain the correct count, notes that this count is in the following cycle, and remembers this fact when the required count is eventually reached.

The next step is for the memory control 103 to utilise the comparator 105 in order to answer the question "should the event be ON?". As indicated at box 118 in FIG. 10 this is equivalent to answering the question as to whether the count is both greater than or equal to the ON angle (as increased by the addition of the primary or secondary angle) and less than the OFF angle (also as increased by the addition of the primary or secondary angle, as appropriate).

The answer to this question is provided in the form of an output command signal from the comparator 105. This output command signal is either an ON signal or an OFF signal which is applied to all the output stages 108 (FIG. 9). There is an output stage 108 for each event and each output stage 108 contains an output circuit (for controlling a solenoid for the particular event) and the next stage in the logic sequence, as indicated by box 119 (FIG. 10), is to check the output circuit for the event under examination—in this case event number 2 of section number 1. This step is effected by a combination of the output command signal from the comparator 105 and an output address signal from the memory control 103 which, similarly to the output command signal, is applied to all the output stages 108. The output address signal causes the particular output stage 108 for event number 2 of section number 1 to receive the output command signal from comparator 105, and effect a change in the signal to the output circuit and solenoid, if this is not in the condition required by the output command signal.

When the question of box 119 has been answered and appropriate action taken, if necessary, the memory control 103 passes to the next step indicated at box 120 which is a check as to whether the event number is equal to 32. If it is not, as in the case under discussion when the event number equals 2, the memory control 103 is automatically caused to reset to box 115 which results in the event number being increased and the sequence of events denoted by boxes 116, 117, 118, 119 and 120 being repeated. The memory control 103 thus checks the condition of all the events for section number 1 until the event number equals 32 when the memory control 103 passes to the question "is the section number equal to 8?" as shown in box 121. As all that has so far been done is to scan all the electronic events in section 1, the answer to the question of box 121 is 'no' and memory control 103 therefore takes the loop 123 which results in the section number being increased by one in the step at box 124. The memory control 103 will then investigate section number 2 starting with event number 1 and repeating for section number 2 the process already described for section number 1. When this sequence has been repeated for all the sections, the section number will equal 8, which will signify the end of the core scan (box 125) and the memory control 103 will then move back to the start of the sequence at box 110 which requires it to wait until the receipt of another pulse indicates that the counter 102 has again been incremented by one.

Referring again to FIG. 9 there is shown a manual data entry means 127, for example a keyboard which enables changes to be entered into the memory 104 under control of the memory control 103. When the reheat time is to be changed without changing the relative timings of any of the events in either the primary or the secondary cycle, this may be done through the manual data entry means 127 which utilises data entry and status display control means 128 into which a new figure for either the primary or the secondary angle is recorded, displayed on status display 129 for checking, and then entered into the memory 104 to be stored as event 1 of the appropriate section. The entry of the new count for either the primary of the secondary angle into the memory 104 is effected under control of the memory control 103 at an appropriate time in the operation of the particular section, so as not to effect adversely any glassware forming cycle performed in the particular section. Conveniently, the new primary angle or secondary angle will be entered into the memory 104 at a time after the finish of one primary or secondary cycle and before the commencement of another such cycle. Then the next time that the particular primary or secondary cycle is commenced the whole cycle will have been advanced or retarded relative to either the secondary or the primary cycle by an amount corresponding to the change in the primary or secondary angle entered into the memory 104.

In practice variation in the reheat time will usually be achieved by varying the secondary angle stored in the memory 104 for the particular machine section. Adjustment of the primary angle by a small amount may be made for obtaining the optimum time for loading of a gob to the machine section, and such adjustment could be utilised to effect a small change in reheat time in appropriate circumstances.

In addition to the basic groups of events or machine functions which are performed at station A and station C and which together make up respectively the primary cycle or the secondary cycle as hereinbefore defined, other events in the operation of machine section are associated with either the primary or secondary angle. The timing of the operation of the first transfer means will be linked to the events of the primary cycle and therefore the primary angle will be added to the signals representative of the first transfer out and first transfer return. Similarly, the operation of the third transfer means will be linked to the events of the secondary cycle so that the stored counts for the operation of the third transfer means will have the secondary angle added to them.

The operation of the second transfer means and the support jaws 22 thereon, however, is linked to the change in the reheat time which is effected by the movement of either or both of the primary and secondary cycles. The movement of the second transfer means to return the support jaws 22 from their second position at station C to their first position at station B, and the closing of the support jaws 22 must be effected in co-ordination with the movement of the first transfer means and must therefore be effected at a count stored as a primary event associated with the primary angle of the primary cycle. Similarly, the movement of the second transfer means to move the support jaws 22 from their first position at station B to their second position at station C, and the opening of the support jaws 22 must be linked to the operation of the blow moulds 37, 37, and therefore these events must be effected as secondary events by signals linked to the secondary angle which controls the events of the secondary cycle.

However, in operation of the system as described with reference to FIG. 9 the condition of each event is checked at each count and it is therefore essential that an event ON angle corresponding to the condition "support jaws 22 close" be given on the occurrence of every pulse received by the counter from the time when the support jaws 22 close under the control of a primary event ON angle for the support jaws 22 until the time when the support jaws 22 open under the control of a secondary event which is an event OFF angle for the support jaws 22. This is achieved by providing event ON and event OFF angles for the support jaws 22 as both primary events and secondary events. The secondary event ON angle for support jaws 22 must always occur before the primary event OFF angle for those support jaws. The actuation of the support jaws is effected by a special output stage 108A which includes an OR gate connected to receive event ON signals in response to the two commands recorded in the memory 104 as a primary event and a secondary event, respectively.

Figure 11:
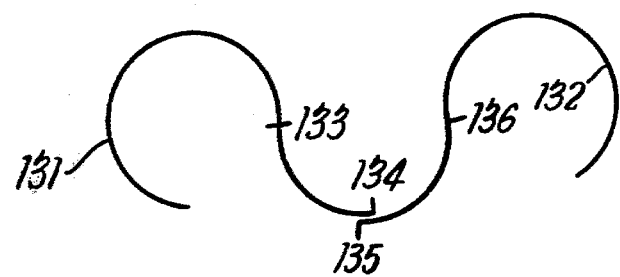
FIGS. 11 and 12 show diagrammatically the manner in which the operation of support jaws of the second transfer means are controlled in accordance with the system of FIGS. 9 and 10.
Figure 12:
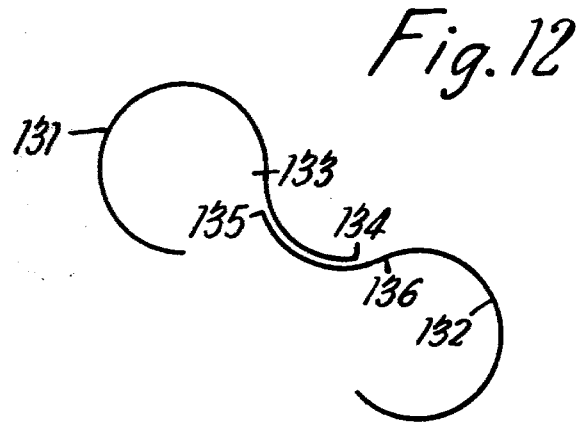

The effect of this arrangement is illustrated in FIGS. 11 and 12 which both show primary events by a line 131 and secondary events by a line 132. As already indicated, the primary events include the primary cycle, the actuation of the first transfer, the return movement of the second transfer and event ON and OFF angles 133 and 134 for the support jaws 22. The secondary events on line 132 commence with an event ON angle 135 for support jaws 22 and also include an event OFF angle 136 for support jaws 22, and the forward movement of the second transfer.

FIG. 11 shows the relative positions of the event ON and OFF angles for the support jaws 22 giving a near-maximum reheat time at station B, while FIG. 12 shows the relative positions of the event ON and OFF angles for the support jaws 22 for a substantially shorter reheat time at station B, the shortening of the reheat time being represented by the extra extent of overlap of the lines 131 and 132 in FIG. 12 as compared with FIG. 11.

It will be appreciated that the support jaws 22 are kept closed by an event ON signal in FIG. 11 derived from the primary cycle through the OR gate of output stage 108A until a time denoted by point 135 in FIGS. 11 and 12 after which there are two ON signals supplied to the OR gate of output stage 108A until a time denoted by point 134 is passed. It is only when the count reaches the time denoted by point 136, which is on the secondary cycle, that there ceases to be an ON signal supplied to one or other of the inputs to the OR gate of output stage 108A, and the solenoid controlling support jaws 22 is de-energised so that these jaws open and the parison is transferred from the second transfer means to the blow mould at station C for final shaping of the article of glassware.

The apparatus in accordance with the present invention provides further substantial advantages over and above those derived from use of the apparatus of FIGS. 11 and 12 of the said co-pending patent application. In the first place the support jaws 22, 22 of the second transfer means are utilised for both supporting the parisons P, P at station B, while the parisons are reheating and being optionally subjected to further forming or other treatment, and transferring the further formed parisons P', P' from station B to station C. This feature gives rise to the advantage that there is less handling of the finish on the parison during formation of the article of glassware than in the apparatus of FIGS. 11 and 12 of the said co-pending patent application, and also there is no requirement to provide separate support means, and actuating means for opening and closing that support means, at station B. The absence of the requirement to provide separate support means (and actuating means therefor) at station B facilitates the provision of means for removing cullet from station B. These advantages derive directly from the fact that the operation of the second transfer means is entirely independent of the operation of both the first transfer means and the third transfer means.

In the embodiment of the present invention as hereinbefore described in which the support jaws 22, 22 of the second transfer means hold the parisons P, P at station B, the apparatus is enabled to handle single bead finishes, whereas the apparatus described with reference to FIGS. 11 and 12 of the said co-pending patent application requires the use of double bead finishes on the parisons and the articles of glassware.

Furthermore, by the provision of entirely independent transfer means for effecting the transfers between stations A, B and C and the deadplate, the movement of each transfer means is enabled to suit the state of the glass as it is being moved by the transfer means. Immediately after pressing at station A the parison is relatively stiff and may be moved quickly from station A to station B, but after reheating at station B the further formed parison P' is relatively soft and must be moved more slowly from station B to station C. However, after formation of the article of glassware at station C this is again relatively stiff and may be moved swiftly to a position over the deadplate. The time of transfer of the article of glassware may be as quick as the third transfer means is capable of moving between its two positions.

Apparatus in accordance with the present invention provides a substantial time during which the article of glassware is suspended by the third transfer means over the deadplate 12. In both the examples given this deadplate hanging time is 240°. This deadplate hanging time is longer than that provided by the apparatus of FIGS. 11 and 12 of the said co-pending patent application as a result of the third transfer means being moved more quickly than the second transfer means.

In both embodiments of the present invention described herein, the reheating parisons are transferred smoothly from station B to station C without excessive swinging, thus obtaining a better distribution of glass in the final container. In the second embodiment (FIGS. 4 to 6) this is achieved by the arcuate transfer motion of the second transfer means. In the first embodiment (FIGS. 1 to 3) the motion of the second transfer means approximates to simple harmonic motion.

When vacuum forming is used to form the articles of glassware the apparatus according to this invention provides for greater mould time than in the apparatus of the said co-pending application.

Also, use of apparatus in accordance with the present invention enables the reheat time of the parison to be made shorter, without effecting any change in the group of machine functions which together make up the primary cycle, than is possible utilising the apparatus which forms the subject matter of the said co-pending patent application.

Apparatus as hereinbefore described in accordance with the present invention enables the positions, the times of operation, and the rates of acceleration of the three transfer means to be selected independently of one another.

In particular, apparatus in accordance with the present invention enables the neck ring structures to spend the majority of their time in their first position (i.e. at station A) while the support jaws 22 spend the majority of their time in their first position (i.e. at station B) but overlapping with the time at which the neck ring structures are at station B, while the tongs 58, 58 spend the majority of their time in their second position (i.e. at the takeout position over the deadplate) thus providing deadplate hanging time.

I claim:

1. An individual section of a multiple section glassware forming machine which comprises three operating stations which are, respectively, a first station including an upright top-opening blank mould for forming a parison, a second station in which reheating of a parison takes place, and a third station including a blow mould for finally shaping an article of glassware, first transfer means including a neck ring structure and actuating means for moving the neck ring structure from a first position in which the neck ring structure engages a parison in the blank mould at the first station to a second position in which the neck ring structure releases the parison at the second station and returning the neck ring structure from the second position to the first position prior to the formation of another parison in the blank mould at the first station, second transfer means including first gripping means for supporting a parison and actuating means for moving the first gripping means between a first position in which the first gripping means supports a parison at the second station and a second position in which the first gripping means supports the parison in such a location at the third station that the blow mould at the third station can close around the parison, and a third transfer means including second gripping means and actuating means for moving the second gripping means between a first position in which the second gripping means engages an article of glassware at the third station and a second position in which the second gripping means holds the article of glassware at a takeout position beyond the third station, the actuating means of each of the first, second and third transfer means being operable independently of the other two actuating means whereby each of the neck ring structure, the first gripping means and the second gripping means is movable between its first and second positions at times independent of the times of corresponding movement of the other two of the said neck ring structure, the first gripping means and the second gripping means.

2. A glassware forming machine section according to claim 1 wherein the actuating means of the second transfer means is operated to return the first gripping means from its second position to its first position following closing of the blow mould and release of the parison at the third station and prior to the release of the next parison by the neck ring structure at the second station, and wherein the first gripping means is effective to support a parison at the second station immediately following release of the parison at the second station by the neck ring structure.

3. A glassware forming machine section according to claim 1 wherein the first gripping means comprises support jaws pivotally carried near one end of a lever arm the other end of which is mounted to a rotatable shaft, and wherein the actuating means of the second transfer means comprises means for rotating the said shaft whereby the pivotally carried support jaws are moved in an arcuate motion between the first and second positions thereof.

4. A glassware forming machine section according to claim 1 wherein the actuating means of the second transfer means causes the first gripping means to be moved in a linear horizontal motion between its first and second positions.

5. A glassware forming machine section according to claim 1 wherein the third transfer means includes a carriage supporting a takeout unit, including second gripping means and a blowhead assembly, the takeout unit and the blowhead assembly being longitudinally displaced on the carriage such that the blowhead assembly is positioned at the third station when the carriage is located for the takeout unit to deposit articles of glassware in a desired takeout position, for example on a deadplate.

6. A glassware forming machine section according to claim 5 wherein the actuating means of the third transfer means comprises a piston and cylinder device, and the third transfer means further includes guide means along which the carriage of the third transfer means is reciprocated by the piston and cylinder device between the first and second positions of the second gripping means.

7. A glassware forming machine section according to claim 1 wherein the first transfer means includes a carriage slidable along the guide means and the actuating means of the first transfer means comprises reciprocating means for moving the carriage of the first transfer means on the guide means thereof in a linear horizontal motion.

8. A glassware forming machine section according to claim 1 wherein each of the first, second and third transfer means includes a respective carriage which is movable in a linear motion controlled by horizontal guide means.

9. A glassware forming machine section according to claim 8 wherein the carriages of the first and third transfer means are movable on the same horizontal guide means and the carriage of the second transfer means is movable on a different horizontal guide means.

10. A glassware forming machine section according to claim 1 wherein the first transfer means includes a carriage which is movable in a linear motion controlled by horizontal guide means and wherein the first gripping means of the second transfer means and the second gripping means of the third transfer means are both movable between their respective first and second positions in respective arcuate motions.

11. A glassware forming machine section according to claim 1 further including means for varying the time for which the parison is supported in the second station and for simultaneously effecting a corresponding consequential change in the timing of the group of machine functions constituting one of the primary and secondary cycles relative to the other of said cycles.

12. A process of forming an article of glassware from a gob of molten glass in an individual section of a multiple section glassware forming machine, which section has three stations spaced apart longitudinally of the section, wherein a primary cycle comprising the machine functions for forming a parison from the gob of molten glass is performed in the first of said stations, a secondary cycle comprising the machine functions for forming an article of glassware in a blow mould is performed at the third of said stations, the parison is moved from the first station to the second station by a first transfer means in a first time, the parison is moved from the second station to the third station by a second transfer means in a second time, and the article of glassware is removed from the third station by a third transfer means in a third time and is supported by the third transfer means over a takeout position, whereby the period elapsing between the time at which the first transfer means brings the parison to the second station and the time at which the second transfer means moves the parison from the second station is adjustable without altering the relative timing of any of the machine functions comprised within either the primary cycle or the secondary cycle, and wherein each of the parison, the further formed parison and the article of glassware is moved by the first, second and third transfer means, respectively, at a rate of acceleration suitable for the condition of the glass contained therein at the time of movement.

13. A process according to claim 12 wherein articles of glassware having single bead finishes are produced by positioning support jaws of the second transfer means at the second station before releasing the parison from the first transfer means so that the parison drops into engagement with the support jaws of the second transfer means, and by opening the support jaws of the second transfer means at the third station after the blow mould has been closed so that the further formed parison drops into engagement with the blow mould and wherein, after opening the blow mould, the third transfer means engages the bead for removing the article of glassware from the third station to a takeout position.

* * * * *

UNITED STATES PATENT AND TRADEMARK OFFICE
CERTIFICATE OF CORRECTION

PATENT NO. : 4,255,178

DATED : March 10, 1981

INVENTOR(S) : David Braithwaite

It is certified that error appears in the above—identified patent and that said Letters Patent is hereby corrected as shown below:

```
Col. 2, line 29 - "ripping" should read --gripping--
Col. 4, line 46 - "parisons" should read --parison--
Col. 5, lines 12 & 13 - "projections" should read --projection--
Col. 6, line 11 - "the" first occurrence should read --this--
Col. 6, line 62 - "applications" should read --application--
Col. 7, line 59 - "operaating stations of" should read
                  --operating stations or--
Col. 14, line 38 - "wheteher" should read --whether--
Col. 15, line 57 - "of" should read --or--
Col. 15, line 60 - "effect" should read --affect--
Col. 18, line 1 - "the" should read --that--
```

Signed and Sealed this

First Day of September 1981

[SEAL]

Attest:

GERALD J. MOSSINGHOFF

Attesting Officer

Commissioner of Patents and Trademarks